United States Patent
Lin et al.

(10) Patent No.: US 9,026,323 B2
(45) Date of Patent: May 5, 2015

(54) PRIMING A START-STOP VEHICLE TRANSMISSION PUMP

(71) Applicant: Ford Global Technologies, LLC, Dearborn, MI (US)

(72) Inventors: Daniel T. Lin, Ann Arbor, MI (US); Eric F. Banners, Plymouth, MI (US); Stephen M. Cicala, Dearborn Heights, MI (US); Tim J. Kropf, Westland, MI (US); Bradley D. Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 13/919,189

(22) Filed: Jun. 17, 2013

(65) Prior Publication Data
US 2014/0371999 A1  Dec. 18, 2014

(51) Int. Cl.
*G06F 7/00* (2006.01)
*B60W 10/30* (2006.01)
*B60W 10/04* (2006.01)
*B60W 10/10* (2012.01)
*F16H 57/04* (2010.01)

(52) U.S. Cl.
CPC ............... *B60W 10/30* (2013.01); *B60W 10/04* (2013.01); *B60W 10/10* (2013.01); *Y10T 477/688* (2015.01); *F16H 57/0436* (2013.01)

(58) Field of Classification Search
CPC ........... F04D 15/00; F04D 9/00; F04D 9/001; F04D 9/041; B60W 10/10; B60W 10/30; B60W 10/04; Y10T 477/688; F16H 57/045; F16H 57/0423; F16H 57/043; F16H 57/0436; F01M 1/02; F16N 7/385
See application file for complete search history.

(56) References Cited

U.S. PATENT DOCUMENTS

| | | | | |
|---|---|---|---|---|
| 7,243,011 B2* | 7/2007 | Koenig et al. | | 701/22 |
| 7,465,250 B2* | 12/2008 | Tamai et al. | | 477/3 |
| 7,544,151 B2* | 6/2009 | Zettel et al. | | 477/160 |
| 7,987,916 B2* | 8/2011 | Laskaris et al. | | 169/24 |
| 8,042,325 B2* | 10/2011 | Cicala et al. | | 60/285 |

* cited by examiner

*Primary Examiner* — David D Le
(74) *Attorney, Agent, or Firm* — James Dottavio; MacMillan, Sobanski & Todd, LLC

(57) ABSTRACT

A method of controlling a start-stop vehicle transmission pump, includes: assessing how long an engine has been turned off; and when the engine has been turned off for longer than a predetermined threshold and the vehicle is on, priming the transmission pump.

21 Claims, 3 Drawing Sheets

PRIMING A START-STOP VEHICLE TRANSMISSION PUMP

BACKGROUND OF THE INVENTION

1. Field of the Invention

This invention relates generally to controlling a vehicle transmission pump.

2. Description of the Prior Art

Engine start-stop technology comes with significant benefits to automotive technologies. It is generally, more fuel economic to be able to routinely turn the engine off in-part or in-full when driving. Other powertrain systems respond to the engine status. For example transmissions linked to the engine have operating schemes that are governed according to whether the engine is on or off—e.g., in hybrid vehicles the electrically variable transmissions can disengage the clutch and rely on motor power. In most transmissions fluid pressure is maintained within a certain range while the transmission is operating. When an engine is first starting, however, the transmission subsystems can require time to work up to performance at a desired level, e.g., a transmission fluid pump can require priming due to air entrapment from oil sloshing. If the transmission pump is used without being primed re-starts can be relatively harsh on transmission components. It is therefore, desirable to have control logic for transmission pump priming in vehicles that employ start-stop technology for the engine.

One U.S. Pat. No. 7,465,250 titled "On-Board Hybrid Transmission Auxiliary-Pump Priming Control System" discusses priming a transmission pump when the engine is off based on the pressure in the transmission. Pressure sensors are added or linked to the pump controller in order to effectuate pump priming. The additional sensors can be expensive to add or complicated to direct to the pump controller. Moreover, it would be beneficial to have pump control logic that is tailored for engine start-stop events and not just programmed to run when the vehicle engine is off.

Therefore, it is ultimately desirable to have a method of controlling a start-stop vehicle transmission pump. It is further desirable to have said method be capable of actuation without the use of pressure sensing devices.

SUMMARY OF THE INVENTION

The present disclosure addresses one or more of the above-mentioned issues. Other features and/or advantages will become apparent from the description which follows.

One advantage of the present disclosure is that it teaches control algorithms for start-stop vehicle transmission pumps. The control algorithms are capable of actuation without the use of pressure sensing devices.

One exemplary embodiment of the present disclosure relates to a method of controlling a start-stop vehicle transmission pump, including: assessing how long an engine has been turned off; and wherein when the engine has been turned off for longer than a predetermined threshold and the vehicle is on, priming the transmission pump.

Another exemplary embodiment of the present disclosure relates to a method of controlling a start-stop vehicle transmission pump, including: assessing a vehicle performance condition; and wherein when the vehicle performance condition is met, priming the transmission pump. The vehicle performance condition relates to any one of a vehicle acceleration, vehicle inclination or engine start-stop timing.

Another exemplary embodiment of the present disclosure relates to a powertrain control circuit for a start-stop vehicle transmission pump, having transmission pump control logic configured to assess a predetermined condition related to vehicle acceleration, vehicle inclination or engine start-stop timing and when the predetermined condition is met, prime the transmission pump.

The invention will be explained in greater detail below by way of example with reference to the figures, in which the same reference numbers are used in the figures for identical or essentially identical elements. The above features and advantages and other features and advantages of the present teachings are readily apparent from the following detailed description for carrying out the invention when taken in connection with the accompanying drawings. In the figures:

DESCRIPTION OF THE PREFERRED EMBODIMENT

Figure 1:
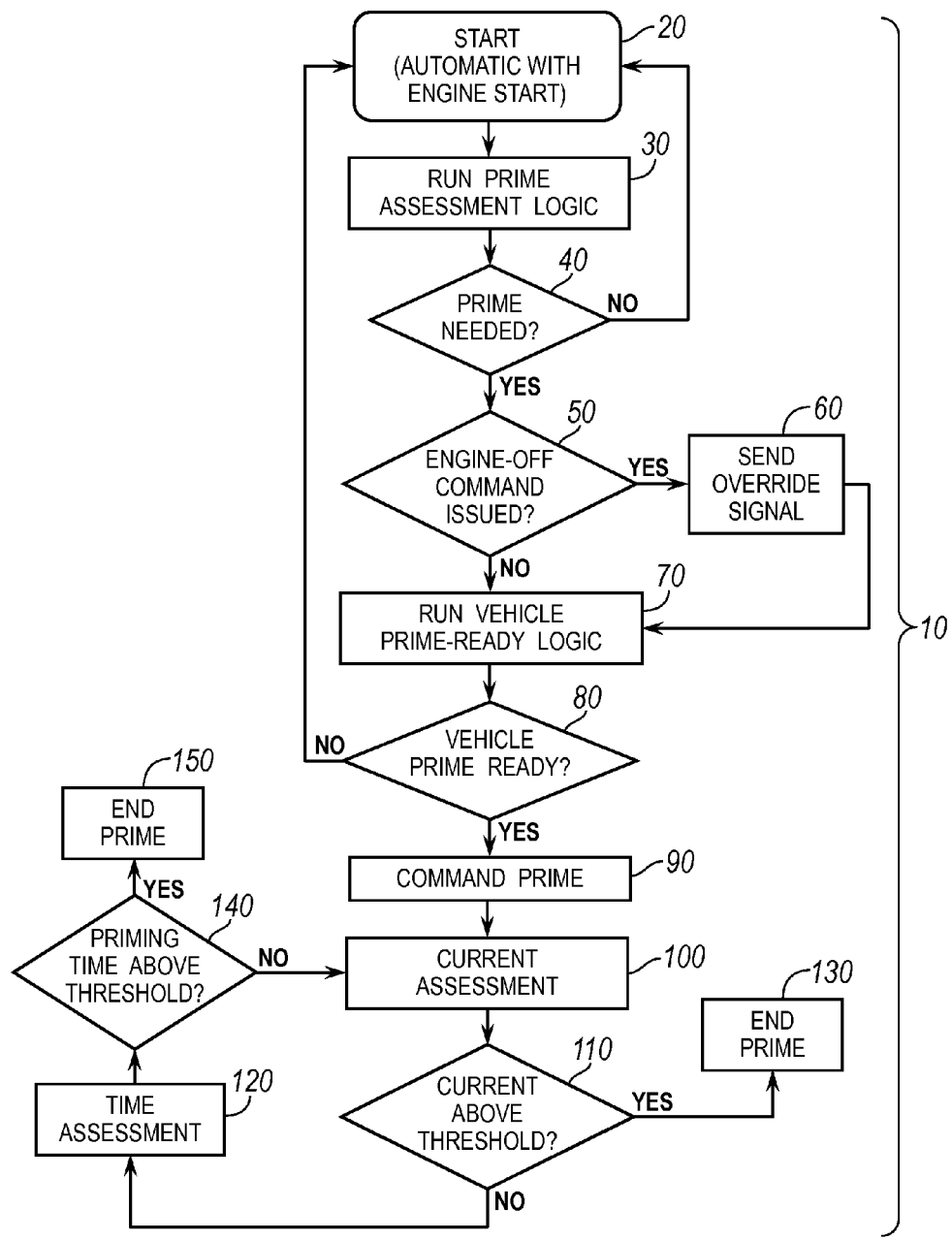
FIG. 1 is a flowchart demonstrating an exemplary control algorithm for a transmission pump for use in a vehicle with engine start-stop technology.

Referring to the drawings, wherein like characters represent examples of the same or corresponding parts throughout the several views, there are shown therein several exemplary control logics for a transmission pump operating in a vehicle equipped with engine start-stop technology. As the vehicle engine cycles through start and stop commands the transmission pump control logics mitigate lulls in transmission operation by priming the pump on-demand. Pump control logics also review vehicle performance conditions that are somewhat attenuated from powertrain operation to ensure that the vehicle is ready for priming. Some examples of this are expressed in an acceleration-dependent priming scheme and a road-grade-dependent priming scheme.

Pump control logics are compatible with any type of vehicle or transmission. Control logics can be programmed as a stand-alone item or incorporated into existing powertrain control modules (PCMs), transmission control modules (TCMs) or vehicle control modules (VCMs).

Figure 2:
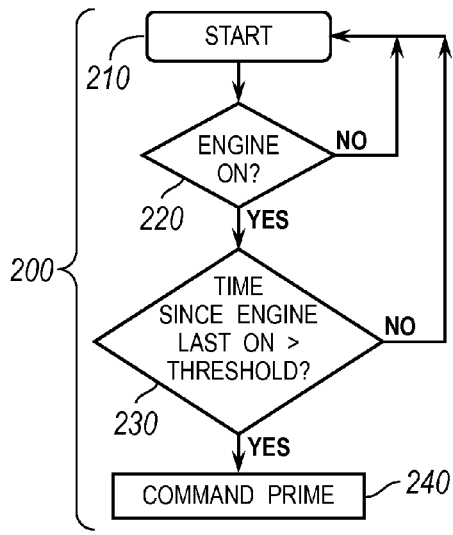
FIG. 2 is a flowchart demonstrating the prime assessment logic of FIG. 1.
Figure 3:
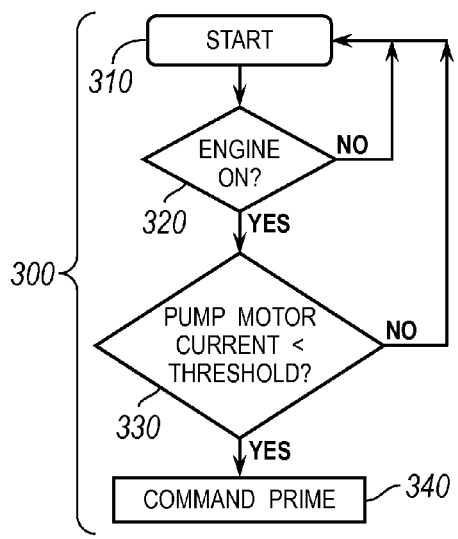
FIG. 3 is a flowchart demonstrating another embodiment of prime assessment logic for use with the method of FIG. 1.

Referring now to FIG. 1, there is shown therein an exemplary method 10 of controlling a transmission pump in a vehicle configured with engine start-stop technology. The program 10 automatically starts when the engine is turned on in this embodiment. In this way, a system check for priming of the pump is consistently done whenever the engine starts. Program starts at step 20. Initially, the program runs prime assessment logic at step 30. Exemplary prime assessment logics are shown in FIGS. 2 and 3. Prime assessment logic sends a signal indicating whether pump priming is desired. At step 40 logic 10 reviews the prime assessment signal to determine if a prime is needed. If a prime is not needed, as determined by prime assessment logic, program returns to start at 20. If a prime is needed the program continues to step 50.

At step 50, as shown in FIG. 1, the program 10 checks to see if an engine-off command has been issued, for example by the powertrain control module. If an engine off command has been issued pump logic has the ability to override the engine off command by sending an override signal to the PCM, e.g., as shown at step 60. Once the override signal is sent the program continues to the next step 70. If no engine-off command has been issued since the start of the program, the program moves directly to step 70.

In the illustrated embodiment of FIG. 1, program 10 is configured to run a prime-ready logic. One exemplary prime-ready logic is illustrated and discussed with respect to FIG. 4. Prime-ready logics assess vehicle conditions, such as acceleration or incline of the vehicle, to determine if the vehicle provides an adequate environment for transmission pump priming. At step 80, the signal from prime-ready logic is reviewed. If a positive signal is received the program begins priming at step 90. If a negative signal is received from prime-ready logic, the program loops back to the start 20.

After prime is commanded at 90, the program 10 checks for criteria that can indicate that the transmission pump is sufficiently primed. In this embodiment, an assessment of pump motor current is made at step 100. At step 110 logic compares the measured current to a predetermined threshold. Where the pump motor current is lower than the threshold, logic continues to run the pump for priming and continues to step 120. Where the pump motor current is higher than the predetermined amount, logic discontinues priming at step 130. An engine oil-to-air ratio can be assessed based on current demand. In this embodiment, the threshold current is 2 Amps. In other embodiments, the current can be greater or lower.

As shown in FIG. 1, logic makes a second assessment as to whether priming continues to be desirable at step 120. At step 120 a system timer is read to determine how long the pump has been priming. A comparison is made at step 140 between a temporal threshold and the measured running time for pump priming since the execution of step 90. If the running time is greater than the threshold, logic assumes the pump is sufficiently primed and continues to step 150. If the running time is less than the threshold, logic loops to step 100 and both assessments, e.g., related to current and time, are re-evaluated until priming is discontinued. In this embodiment, the threshold running time is 5 minutes. In other embodiments, the running time can be greater or lower.

FIG. 2 illustrates exemplary prime assessment logic 200 compatible with the program 10 of FIG. 1. As shown in FIG. 2, logic 200 starts at step 210. At step 220 the program assesses whether the engine is turned on. If the engine is off, the program 200 loops back to start 210. If the engine is turned on, the program continues to step 230. At step 230 a comparison is made between how much time has lapsed since the engine was last on and a predetermined threshold. If the time lapse is greater than the threshold, the assessment logic sends a command prime to the pump or to the pump control logic at step 240. In this embodiment, the threshold time lapse is sixty minutes. In other embodiments, the engine down time can be greater or lower.

FIG. 3 illustrates another exemplary prime assessment logic 300, compatible with the program 10 of FIG. 1. As shown in FIG. 3, logic 300 starts at step 310. At step 320 the program assesses whether the engine is turned on. If the engine is off, the program loops back to start. If the engine is turned on, the program continues to step 330. At step 330 a comparison is made between pump motor power demands and a predetermined threshold. Specifically, the pump current demand is compared to a threshold. If the current demand is less than the threshold, the assessment logic sends a command prime to the pump or to the pump control logic at step 340. In this embodiment, the threshold current is 3 Amps. In other embodiments, the current can be greater or lower.

Figure 4:
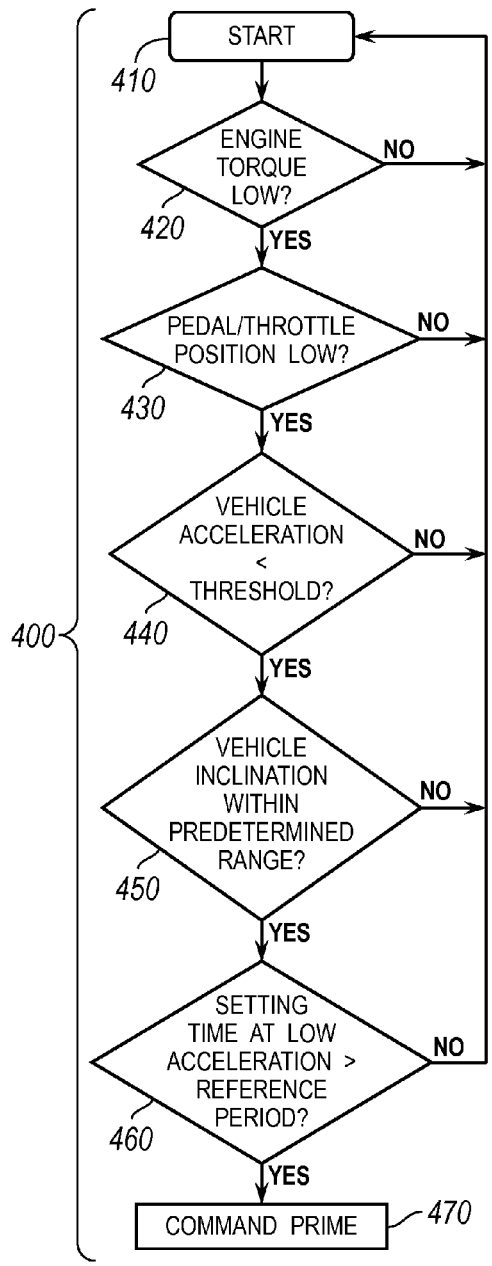
FIG. 4 is a flowchart demonstrating exemplary prime ready logic for use with the method of FIG. 1.

Now turning to FIG. 4, there is shown an exemplary prime-ready logic 400 for the transmission pump. Prime-ready logic 400 determines whether the vehicle is conditioned to allow for an efficient priming cycle. In this embodiment, prime-ready logic 400 assesses the vehicle prime readiness based on vehicle acceleration and vehicle inclination. Any directional acceleration can be used, for example, longitudinal, lateral or vertical acceleration can be measured and utilized as a precondition for pump priming. Also, any angular disposition can be used to determine if the vehicle incline is within a predetermined range. The incline can be with respect to a horizontal axis, a pitch, yaw or roll of the vehicle.

At step 410 the logic begins. Initially as part of the conditions for prime-ready logic, tests are performed to prediction whether imminent vehicle acceleration is likely. This prediction is based on an engine torque estimate and driver-demanded wheel torque. At step 420 a test is made to determine whether engine torque is low. At step 430 a test is made to determine whether either displacement of the accelerator pedal is or engine throttle position is low. If the result of either test 420 and 430 is negative, control returns to step 410.

If the result if both tests 420 and 430 is positive, the logic 400 assesses at step 440 whether the vehicle acceleration is below a predetermined threshold. If so, the program continues by comparing the vehicle inclination to a threshold at step 450. If not, the program loops back to start 410. An exemplary maximum acceleration is 3 ft/sec^2. At step 450 the inclination of the vehicle is compared to another threshold or predetermined range. An exemplary range is, for example, an incline of less than 25 degrees or more than −25 degrees with respect to a horizontal surface. If the vehicle is outside of the preferred range for inclination, the program returns to start at 410. To ensure that the pump inlet tube is located in oil and that oil sloshing will not cavitate the pump, at step 460 a test is performed to determine whether the vehicle has remained at low acceleration for a period greater than a reference period. If the required vehicle conditions 420-460 are present, the prime-ready logic issues a prime command at 470.

Figure 5:
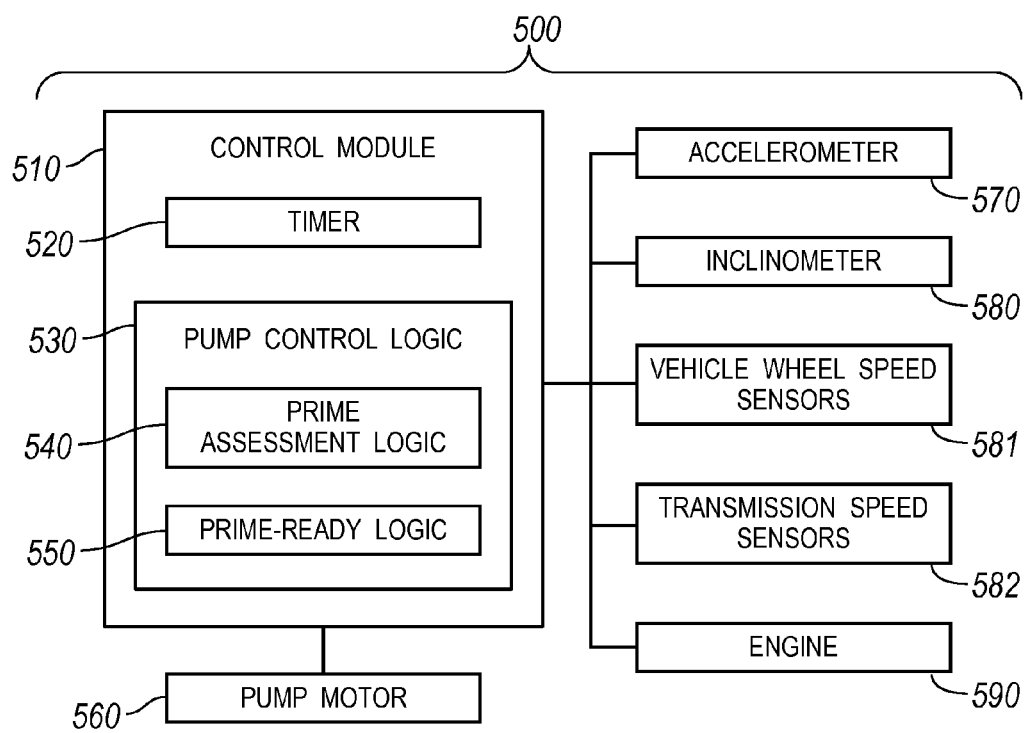
FIG. 5 is a schematic depiction of a powertrain control circuit configured to execute the method of FIG. 1.

Now with reference to FIG. 5, there is shown therein an exemplary powertrain control circuit 500 for use in a vehicle with start-stop logic. The control circuit 500 includes a control module 510 that could be a PCM or TCM, for example. Control module 510 includes a timer 520. Timer 520, in this embodiment, is configured to assess a running time for the pump during priming and also configured to measure a lapse between engine start events and engine stop events. As discussed above, this information is utilized by pump control logics, e.g., as shown in FIG. 1. Pump control logic 530 is included in the control module 510 of FIG. 5. Pump control logic 530 includes a prime assessment logic 540. Exemplary prime assessment logics (200 and 300) are discussed with respect to FIGS. 2 and 3, respectively. Pump control logic 530 further includes prime-ready logic 550. Prime-ready logic 550 can be of the type of logic discussed with respect to FIG. 4. The control module 510 is linked to pump motor 560 and configured to control actuation of the motor. Control module 510 is also configured to receive operating data related to the motor, e.g., current demand, running time, and other information.

The control circuit 500 of FIG. 5 also includes sensors and a link to the vehicle engine. An accelerometer 570 is included in this control circuit 500 to determine vehicle acceleration. Other means of measuring vehicle acceleration can be used (e.g., an acceleration pedal sensor or an engine torque measuring device). The control circuit 500 also includes an inclinometer 580. The inclinometer 580 is configured to assess an angular position of the vehicle with respect to a design position or zero degrees with respect to an axis. Control circuit 500 also includes speed sensors that produce signal representing speed of each vehicle wheel 581 and a transmission speed sensor preferably at the transmission output shaft for estimating vehicle movement and acceleration.

Control module 510 is linked to an engine 590 as well. Data related to engine performance is fed to control module 510. Further, when needed, control module 510 is configured to communicate an engine-off command override to the engine 590 or engine controller so as to continue engine operation in support of the transmission pump 560.

The disclosed programs can be incorporated into a control module as shown in FIG. 5 or into other controllers. Programs can be stored using known memory devices, e.g., ROM or DROM. Programs can be encoded in any known programming language including but not limited to C++, Basic, Matlab, or Pascal.

Those familiar with the art to which this invention relates will recognize various alternative designs and embodiments for practicing the invention within the scope of the appended claims.

In accordance with the provisions of the patent statutes, the preferred embodiment has been described. However, it should be noted that the alternate embodiments can be practiced otherwise than as specifically illustrated and described.

We claim:

1. A method of controlling a start-stop vehicle transmission pump, comprising:
upon starting an engine,
automatically priming the transmission pump, provided a controller determines that a time since the engine was last on is longer than a predetermined time threshold and not priming the transmission pump if the time since the engine was last on is not longer than the threshold.

2. The method of claim 1, further comprising:
determining if an oil-to-air ratio in the pump is within a predetermined range.

3. The method of claim 2, further comprising:
ceasing priming the transmission pump, provided the oil-to-air ratio is within the predetermined range.

4. The method of claim 2, wherein determining if the oil-to-air ratio is within the predetermined range includes monitoring pump current to assess whether the current is below a predetermined current threshold.

5. The method of claim 4, further comprising:
turning the pump off, provided the time since the engine was last on to engine start is engine has been off for less time than the predetermined time threshold.

6. The method of claim 5, further comprising:
overriding an engine-off command to keep the engine running, while priming the transmission pump.

7. The method of claim 6, further comprising:
assessing a vehicle acceleration; and
priming the transmission pump provided the vehicle acceleration is below a predetermined acceleration threshold and the time since the engine was last started is longer than the time threshold.

8. The method of claim 1, further comprising:
wherein when priming the transmission pump, overriding an engine-off command to keep the engine running.

9. The method of claim 1, further comprising:
assessing a vehicle acceleration; and
priming the transmission pump provided the vehicle acceleration is below a predetermined acceleration threshold and the time since the engine was last on is longer than the time threshold.

10. The method of claim 1, further comprising:
assessing a degree of incline for the vehicle; and
priming the transmission pump provided the incline for the vehicle is below a predetermined incline threshold and the time since the engine was last on is longer than the time threshold.

11. A method of controlling a start-stop vehicle transmission pump, comprising:
determining a vehicle acceleration and a vehicle inclination; and
automatically priming the transmission pump, provided the vehicle acceleration is less than a predetermined acceleration threshold and the vehicle inclination is within a predetermined range.

12. The method of claim 11, further comprising:
using one of an engine torque estimate, an engine torque command, accelerator pedal position and engine throttle position to predict an imminent acceleration of the vehicle.

13. The method of claim 11, further comprising:
priming the transmission pump provided the vehicle has remained below the predetermined acceleration threshold for a period whose length is greater than a reference period.

14. The method of claim 11, further comprising:
determining if an oil-to-air ratio in the pump is within a predetermined range.

15. The method of claim 14, further comprising:
wherein when the oil-to-air ratio is within the predetermined range, ceasing pump priming.

16. The method of claim 14, wherein determining if the oil-to-air ratio is within the predetermined range includes monitoring pump current to assess whether the current is below a predetermined current threshold.

17. The method of claim 11, further comprising:
after initiating priming the transmission pump, ceasing priming the transmission pump provided the pump priming exceeds a predetermined pump priming time threshold.

18. The method of claim 11, wherein when priming the transmission pump, overriding an engine-off command to keep the engine running.

19. A powertrain control circuit for a start-stop vehicle transmission pump, comprising:
transmission pump control logic configured to assess a vehicle inclination and when the vehicle inclination is within a predetermined range, to prime the transmission pump.

20. The powertrain control circuit of claim 19, further comprising:
a powertrain control module (PCM) linked to the transmission pump control logic;
a timer in the PCM configured to track a time since the engine was last on;
wherein the PCM is configured to assess whether a vehicle engine is on or off; and
wherein the transmission pump control logic is configured to prime the transmission pump when the time since the engine was last on is longer than a predetermined time threshold and the engine is on.

21. The powertrain control circuit of claim 20, wherein the PCM is configured to ascertain a current demand for the transmission pump;
wherein the transmission pump control logic is configured to determine an oil-to-air ratio for the transmission pump based on the current demand; and wherein the transmission pump control logic is configured to cease priming when the oil-to-air ratio is within a predetermined range.

* * * * *